United States Patent [19]

Chalmers

[11] 4,069,180

[45] Jan. 17, 1978

[54] HALOGENATED POLYACRYLATE ELASTOMERS

[75] Inventor: David Calder Chalmers, Sarnia, Canada

[73] Assignee: Polysar Limited, Sarnia, Canada

[21] Appl. No.: 600,449

[22] Filed: July 30, 1975

[30] Foreign Application Priority Data

Sept. 26, 1976 Canada .................................. 210139

[51] Int. Cl.² ........................ C08F 28/00; C08L 91/00
[52] U.S. Cl. ................................ 260/23 AR; 260/79; 526/16; 526/43
[58] Field of Search ........................... 526/16, 43, 324; 260/23 AR, 79.5 B, 79.5 C

[56] References Cited

U.S. PATENT DOCUMENTS

| | | | |
|---|---|---|---|
| 2,301,926 | 11/1942 | Blomer | 526/43 |
| 2,831,839 | 4/1958 | Canterino et al. | 526/16 |
| 3,435,010 | 3/1969 | Starer et al. | 260/23 AR |
| 3,458,461 | 7/1969 | Mihal | 260/23 AR |
| 3,746,674 | 7/1973 | Behrens | 260/23 AR |
| 3,763,119 | 10/1973 | De Marco et al. | 260/23 AR |
| 3,912,672 | 10/1975 | Morris et al. | 260/23 AR |

FOREIGN PATENT DOCUMENTS

| | | |
|---|---|---|
| 1,062,969 | 3/1967 | United Kingdom. |
| 1,069,121 | 5/1967 | United Kingdom. |

OTHER PUBLICATIONS

Whitby–Synthetic Rubber, (Wiley), (N.Y.), (1954), pp. 902, 903, 935.

*Primary Examiner*—Donald E. Czaja
*Assistant Examiner*—H. H. Fletcher
*Attorney, Agent, or Firm*—Stevens, Davis, Miller & Mosher

[57] ABSTRACT

Polyacrylate elastomers are prepared by polymerizing a mixture of an acrylate monomer and a diolefin such as isoprene to yield a polymer containing carbon-to-carbon unsaturation and this polymer is then treated with bromine to yield a bromine containing acrylate polymer which is curable with zinc oxide, zinc oxide and sulphur or sulphur and alkali metal salts of fatty acids.

4 Claims, No Drawings

HALOGENATED POLYACRYLATE ELASTOMERS

This invention relates to novel synthetic elastomers and vulcanizates thereof. More particularly, it relates to novel polyacrylate elastomers, processes for preparing the novel polyacrylate elastomers, and vulcanizates thereof.

Polyacrylate elastomers are known. They are prepared by the emulsion polymerization of alkyl acrylates, for example ethyl acrylate, butyl acrylate etc., sometimes in admixture with other alkyl acrylates, alkylalkoxyacrylates, acrylonitrile and the like, to form copolymers. Polyacrylate elastomer vulcanizates show a high degree of oil resistance, which renders them suitable for use in oil seals, gaskets, hoses etc.

Since a conventional polyacrylate elastomer comprises in the main a polymer or copolymer which is free from carbon-to-carbon unsaturations, vulcanization thereof cannot normally be accomplished by use of sulfur. They would normally be cured by heating with peroxide curing agents.

Attempts have been made to prepare polyacrylate elastomers of improved vulcanizability by copolymerizing with the acrylate monomers suitable monomers, such as allyl glycidyl ether and glycidyl methacrylate. Whilst these products are vulcanizable with sulphur in combination with sulphur containing accelerators, their sulphur vulcanizates have been found to be deficient in oil resistance and dynamic properties. Polyacrylate elastomers containing chlorine groups are also known, these being prepared by copolymerizing with the acrylate monomers a chlorine containing monomer, such as chloroethyl vinyl ether and vinyl chloroacetate. Such products, whilst vulcanizable with amine compounds and with alkali metal salts of fatty acids admixed with sulphur, again yield vulcanizates deficient in various properties.

It has now been found that polyacrylate elastomer vulcanizates having good physical properties can be prepared by copolymerizing with the acrylate monomers a diolefinic hydrocarbon monomer, then halogenating the resulting copolymer, and vulcanizing the halogenated copolymer either with sulphur and alkali metal salts of fatty acids, or with a zinc oxide curing system.

Thus according to one aspect of the present invention, there is provided a vulcanizable halogenated elastomeric polymer comprising a copolymer of at least one alkyl acrylate and at least one diolefinic hydrocarbon, and containing halogen selected from bromine and chlorine.

According to a second aspect of the invention, there is provided an elastomeric vulcanizate of an acrylate copolymer, said vulcanizate comprising the reaction product of:

1. a copolymer of at least one alkyl acrylate and at least one diolefinic hydrocarbon, and containing halogen selected from bromine and chlorine; and
2. a vulcanizing amount of vulcanizing ingredients selected from zinc oxide, combinations of zinc oxide and sulphur, and combinations of alkali metal salts of fatty acids and sulphur.

According to yet another aspect of the invention, there is provided a process for the production of a vulcanizable halogenated elastomeric polymer comprising polymerizing a monomeric mixture comprising at least one alkyl acrylate and at least one diolefinic hydrogen, reacting the so formed polymer with a hologen selected from bromine and chlorine and recovering the vulcanizable halogenated elastomeric polymer.

The preferred diolefinic hydrocarbons for use in the present invention are isoprene and ethylidene norbornene, with isoprene being the most preferred. Isoprene polymerizes readily in polymerization systems used for acrylate polymerization. Copolymers containing copolymerized isoprene units are readily halogenated to yield vulcanizable products.

Copolymers for halogenation to prepare polymers according to the present invention suitably contain from about 0.1 to about 6 mole percent, preferably from about 1 to about 5 mole percent, carbon-to-carbon unsaturation derived from copolymerization therein of the diolefin such as isoprene. This amount is controlled by the quantity of isoprene added to the polymerization recipe.

Alkyl acrylates for use in the present invention are those normally used for preparing polyacrylate elastomes. Preferably, these are lower alkyl acrylates, for example ethyl acrylate, propyl acrylate, n-butyl acrylate, methyl methacrylate, ethyl methacrylate, butyl methacrylate and the like. Such acrylates can be used alone for copolymerization with the conjugated diolefin, or they can be additionally copolymerized with alkoxyalkyl acrylates, e.g. methoxymethyl acrylate, methoxyethyl acrylate, ethoxyethyl acrylate, and the like. Other conventional vinylidene monomers normally used in preparing acrylate elastomers, such as acrylonitrile, vinyl halides, vinyl ethers, vinyl ketones etc. can be copolymerized with the acrylates and conjugated diolefin, if desired.

The preparation of copolymers for halogenation to prepare polymers according to the invention is generally in accordance with processes known in the art for polymerizing acrylates to form elastomers. These include emulsion (latex) and solution techniques. Emulsion techniques are preferred, since by such methods the polymerization of monomers to polymers is most readily controllable. The polymerization can be performed as a batch reaction, or one or more ingredients can be added incrementally as the polymerization proceeds or the polymerization may be a continuous process. The most preferred polymerization system is in aqueous emulsion, using free radical initiators. The temperature of polymerization can range from about 0° to about 95° C, and is preferably within the range 5° C to 50° C. The polymerization is preferably conducted in the absence of oxygen.

The polymerization recipe includes a free-radical generating agent, for example an organic peroxide, or a hydroperoxide, such as benzoyl peroxide, dicumyl peroxide, cumene hydroperoxide, paramethane hydroperoxide, and the like. Redox systems may also be used. Alternatively, the free radical generating compound may be an azo compound such as azobisisobutyronitrile and the like. Persulfate salts such as sodium and potassium persulfate, used either alone or in redox systems, may alternatively be used. Typical acrylate polymerization emulsion systems and recipes are well known to those skilled in the art, and do not require further elucidation here.

The amount of isoprene which is added to the polymerization recipe is suitably from about 0.2 to about 10 parts by weight per 100 parts by weight of total monomers. In the preferred emulsion polymerization system, of the order of 60% of the isoprene becomes copolymerized in the products, and so the above amounts are sufficient to ensure a range of unsaturation in the product of from about 0.1 to about 6 mole percent.

In the process of the present invention, after the copolymers have been prepared, they are halogenated either with bromine or chlorine. It is preferred to use bromine as the halogen. The bromine is believed to react with the unsaturated copolymer in a substitutive manner, leading to the formation of allylic bromide groups in the copolymer. Suitably, this bromination is accomplished by dissolving the unsaturated copolymer in a suitable organic solvent, such as chloroform, adding water to the solution, and then adding a solution of bromine in the same organic solvent. After a brief interval, a small amount of caustic soda aqueous solution is added to neutralize any excess bromine, and the mixture is left to react under stirring. Then the brominated product is recovered as rubber crumb which may be further washed and dried. Alternatively the unsaturated copolymer in the form of a latex may be treated directly with bromine, any excess bromine being removed by reaction with, for example, an aqueous alkali solution, and the brominated polymer recovered in the conventional manner.

It is preferred to obtain a polymer having a bromine content of from about 0.5 to about 1.5 atoms of bromine per mole of unsaturation in the product, most preferably about 1 bromine atom per mole of unsaturation.

As in the case of known polyacrylate elastomers, the halogenated copolymers of the present invention are preferably compounded with reinforcing fillers and curatives, and then heated in compound form to prepare the vulcanizates. Thus, the polymer may be compounded with carbon black, reinforcing silica, clay and the like, and antioxidants well known in the art. Suitably, from about 10 to 100 parts by weight, preferably from about 40 to about 60 parts by weight, of carbon black are mixed with 100 parts by weight of polymer. When using the alkali metal salt of a fatty acid-sulphur curing system, it is suitable to use from about 0.5 parts to about 6 parts by weight, preferably from about 1.0 parts by weight to about 5 parts by weight, of at least one alkali metal salt of a fatty acid, the preferred fatty acid being stearic acid and the preferred alkali metals being sodium and potassium, or mixtures thereof and from about 0.1 to about 3 parts by weight of sulphur, per 100 parts by weight of copolymer. Alternatively, the halogenated copolymers of the present invention may be cured by reaction with zinc oxide or with zinc oxide and sulphur optionally in the presence of one or more of the well known sulphur containing accelerators. Zinc oxide, when used as the sole curing agent, is suitably present in amounts from about 1 to about 20 parts by weight, preferably from 2 to 10 parts by weight, per 100 parts by weight of the copolymer. When zinc oxide and sulphur are used, the zinc oxide is suitably from about 1 to about 10 parts by weight, preferably from 2 to 6 parts by weight, per 100 parts by weight of copolymer and the sulphur is suitably from about 0.1 to about 2 parts by weight, preferably from about 0.2 to 1 part by weight, per 100 parts by weight of copolymer. As an alternative to, or in addition to, the sulphur, it is permissible to use one or more of the well known sulphur containing accelerators in an amount of from about 0.1 to about 2 parts by weight per 100 parts by weight of copolymer. Curing is effected in the normal way, by heating the compounds from about five minutes to about four hours at temperatures from about 120° to about 200° C, optionally followed by a post cure involving heating for about one to twenty-four hours at about 150° C to about 200° C.

The invention will be further described with reference to the following specific examples.

EXAMPLE 1

An ethyl acrylate/isoprene copolymer was prepared and brominated in accordance with the present invention. Portions of the brominated copolymer were compounded and cured, in various recipes, and the resulting vulcanizates tested for physical properties.

The polymerization was conducted according to conventional polyacrylate emulsion polymerization techniques, using the following polymerization recipe:

|  | parts by weight |
|---|---|
| Water | 250 |
| alkyl aryl disulfonate | 3.0 |
| Borax | 0.5 |
| Potassium persulfate | 0.5 |
| sodium dithionate | 0.06 |
| Ethyl acrylate | 95 |
| Isoprene | 5 |
| Ferrous sulfate heptahydrate | 0.0036 |

The above figures represent the total amount of the ingredients used. The monomers were added in 4 separate equal amounts, at 10 minute intervals. The ferrous sulfate and half of the sodium dithionate were added after the first monomer addition, to start the polymerization.

Polymerization was conducted at 45° C for about 4.5 hours, for the most part under agitation. The final pH of the polymerization emulsion was 7.9. Then the polymer was recovered in the normal way, by coagulation using 0.3% calcium chloride. A total conversion of monomer of 93% was achieved. The product was totally soluble in toluene, and had an intrinsic viscosity of 0.48.

Two portions of the copolymer so formed were brominated separately and then recombined. The first portion constituted 100g, and was dissolved in 2 liters of chloroform. 200g of water was added to the solution. The reaction mixture was stirred at room temperature, and 10g of bromine dissolved in 100ml of chloroform was added. After 5 minutes reaction time, 40 ml of 10% caustic soda solution was added, and the reaction mixture stirred for 45 minutes at which point the bromine color had reappeared. The mixture was discolored with an additional 10ml of 10% caustic soda solution. Then 700ml heptane was added and the mixture heated to remove the volatile components. The residual crumb of brominated copolymer was washed 3 times with water and mill dried at 110° C.

The second portion constituted 150g, and was brominated as above, except that the heptane addition was omitted, except for addition of a small amount of heptane after most of the chloroform was removed. The 2 portions were recombined and found to have an intrinsic viscosity of 0.51 and a solubility in toluene of 98.4%.

Portions of the brominated polyacrylate so formed were then compounded and vulcanized, and properties of the vulcanizate determined. The compounding and vulcanizing recipe employed was as follows:

|  | parts by weight |
|---|---|
| Polymer | 100 |
| Carbon black | 50 |
| Aminox* (antioxidant) | 2 |

-continued

| | parts by weight |
|---|---|
| Sulphur | 0.25 |
| Potassium stearate | variable |

*Trademark

For each portion, 2 different curing times were used on different parts of it, Part A being heated to 153° C for 20 minutes and Part B being heated to 153° C for 20 minutes followed by a post cure of 6 hours at 185° C.

Further compounding details and results of testing are shown in Table 1.

TABLE 1

| Sample No. | 1A | 1B | 2A | 2B | 3A | 3B | 4A | 4B |
|---|---|---|---|---|---|---|---|---|
| Potassium Stearate (parts by weight) | 2.5 | 2.5 | 3.5 | 3.5 | 5.0 | 5.0 | 1.0 | 1.0 |
| Tensile strength (Kg/cm$^2$) | 28 | 81 | 29 | 83 | 28 | 72 | 100 | 136 |
| Elongation (%) | 310 | 150 | 300 | 150 | 350 | 180 | 460 | 270 |
| 100% modulus (Kg/cm$^2$) | 27 | 78 | 29 | 78 | 26 | 66 | — | 39 |

Samples 4A and 4B were a commercially available polyacrylate and additionally contained 1.0 parts stearic acid and 1.5 parts sodium stearate in the compounding recipe. Samples 4A and 4B are control samples and outside the scope of the present invention.

EXAMPLE 2

A further copolymer of ethyl acrylate and isoprene was prepared, having higher molecular weight than those of Example 1, brominated and cured.

Polymerization was conducted in an aqueous emulsion system using the following recipe:

| | parts by weight |
|---|---|
| Water | 250 |
| alkyl aryl disulfonate | 3.0 |
| Borax | 0.5 |
| Potassium persulfate | 0.5 |
| Sodium dithionate | 0.06 |
| Ethyl acrylate | 95 |
| Isoprene | 5 |

The monomers were added in 4 equal increments at 30 minute intervals. Polymerization was conducted at 45° C under agitation. Small additional quantities of sodium dithionate were added after the first and second increments. Then the copolymer was coagulated, recovered and dried as described in Example 1. The copolymer was found to have an intrinsic viscosity of 0.63, a Mooney (ML-4 at 212° F) of 72.5 and an unsaturation of 2.9 mole %.

The copolymer was brominated by dissolving 150g of polymer in 3 liters chloroform and adding 300ml water and 15g bromine to the solution. After 5 minutes at room temperature, the mixture was neutralized with 50 ml of 10% caustic soda. The emulsion was stirred for 5 minutes, the polymer recovered in a steam coagulator and dried on a mill at 110° C. The product was found to have a bromine content of 3.3 weight %. 3 samples of the brominated copolymer so formed were then compounded with carbon black and curatives, and vulcanized by heating in a mold at 153° C for 20 minutes (mold cured). A portion of each sample was additionally subjected to a post cure, involving heating at 185° C for an additional 6 hours. The details of the compounding recipes and properties determined on the resulting vulcanizates are given in Table 2, in which the quantities of ingredients are given in parts by weight.

TABLE 2

| Sample No. | 5A | 5B | 6A | 6B | 7A | 7B |
|---|---|---|---|---|---|---|
| Brominated copolymer | 100 | 100 | 100 | 100 | 100 | 100 |
| Carbon black | 50 | 50 | 50 | 50 | 50 | 50 |
| Zinc oxide | 5 | 5 | 5 | 5 | — | — |
| Sulphur | 0.5 | 0.5 | — | — | 0.25 | 0.25 |
| Stearic acid | — | — | — | — | 1.0 | 1.0 |
| Aminox | — | — | — | — | 2.0 | 2.0 |
| Sodium stearate | — | — | — | — | 1.5 | 1.5 |
| Potassium stearate | — | — | — | — | 1.0 | 1.0 |
| Mold cured only | √ | | √ | | √ | |
| Post cured | | √ | | √ | | √ |
| Tensile strength (Kg/cm$^2$) | 58 | 110 | 65 | 129 | 38 | 80 |
| Elongation (%) | 400 | 110 | 330 | 100 | 410 | 190 |
| 100% modulus (Kg/cm$^2$) | 55 | 110 | 59 | 129 | 36 | 78 |

EXAMPLE 3

Using the procedures of Example 2, a copolymer of ethyl acrylate, ethoxyethyl acrylate and isoprene was prepared, brominated, cured and tested. The polymerization conditions and recipe were as in Example 2, except that the 95 parts ethyl acrylate and 5 parts isoprene were replaced by 67 parts ethyl acrylate, 30 parts ethoxyethyl acrylate and 3 parts isoprene. The copolymer so formed had an unsaturation of 2.0 mole percent and a Mooney viscosity (ML-4 at 212° F) of 54.0.

The copolymer was brominated as described in Example 2, except that 3.5 liters chloroform was used to dissolve the polymer. The copolymer so treated was found to have 2.1 weight % bromine content. Samples of the brominated product were compounded and vulcanized as described in Example 2, and their properties tested. The compounding recipes and results are given in Table 3, in which the quantities of ingredients are given in parts by weight. Each of the samples reported was mold cured only, with the exception of sample 10B which was additionally post cured, as described in Example 2.

TABLE 3

| Sample No. | 8 | 9 | 10 | 10B |
|---|---|---|---|---|
| Brominated copolymer | 100 | 100 | 100 | 100 |
| Carbon black | 50 | 50 | 50 | 50 |
| Zinc oxide | 5.0 | 5.0 | — | — |
| Sulphur | 0.5 | — | 0.25 | 0.25 |
| Stearic acid | — | — | 1.0 | 1.0 |
| Aminox | — | — | 2.0 | 2.0 |
| Sodium stearate | — | — | 1.5 | 1.5 |
| Potassium stearate | — | — | 1.0 | 1.0 |
| Tensile strength (Kg/cm$^2$) | 34 | 41 | 25 | 72 |
| Elongation (%) | 400 | 370 | 430 | 280 |
| 100% modulus (Kg/cm$^2$) | 27 | 31 | 16 | 36 |
| 300% modulus (Kg/cm$^2$) | 34 | 41 | 25 | — |

What is claimed is:

1. A vulcanizable halogenated elastomeric polymer comprising a copolymer of at least one alkyl acrylate or alkyl methacrylate, the alkyl groups having one to four carbon atoms, and at least one diolefinic hydrocarbon selected from isoprene and ethylidene norbornene, said diolefinic hydrocarbon forming from about 0.1 to about 6 mole percent of the copolymer, said copolymer being halogenated by reaction with a halogen selected from bromine and chlorine such that the amount of halogen in said copolymer is from about 0.1 to about 6 weight percent.

2. The polymer of claim 1 wherein the diolefinic hydrocarbon is isoprene which forms from about 1 to about 5 mole percent of the copolymer.

3. The polymer of claim 2 wherein the halogen is bromine.

4. A process for preparing polyacrylate elastomeric vulcanizates which comprises copolymerizing at least one alkyl acrylate or alkyl methacrylate, the alkyl groups having one to four carbon atoms, and at least one diolefinic hydrocarbon selected from isoprene annd ethylidene norbornene by an aqueous emulsion free radical polymerization process at 5 to 50° C reacting the so-formed copolymer with a halogen selected from bromine and chlorine such that the amount of halogen is from about 0.1 to about 6 weight percent of the halogenated copolymer, and vulcanizing the copolymer to an elastomeric vulcanizate by heating for from 5 minutes to four hours at a temperature of from about 120° C to about 200° C in the presence of vulcanizing ingredients selected from 2 to 10 parts of zinc oxide, from 2 to 6 parts of zinc oxide, plus 0.2 to 1 part of sulphur, and from 1 to 5 parts of the sodium or potassium salts, or mixtures thereof, of stearic acid plus from 0.1 to 3 parts of sulphur, all parts being parts by weight per 100 parts by weight of copolymer.

* * * * *

UNITED STATES PATENT AND TRADEMARK OFFICE
CERTIFICATE OF CORRECTION

PATENT NO. : 4,069,180
DATED : January 17, 1978
INVENTOR(S) : David Calder CHALMERS It is certified that error appears in the above–identified patent and that said Letters Patent are hereby corrected as shown below:

[30] Foreign Application Priority Data,

"Sept. 26, 1976" should be -- Sept. 26, 1974 --

Signed and Sealed this

Thirty-first Day of October 1978

[SEAL]

Attest:

RUTH C. MASON
*Attesting Officer*

DONALD W. BANNER
*Commissioner of Patents and Trademarks*